(12) United States Patent
Ferreira (10) Patent No.: US 11,379,593 B2
(45) Date of Patent: Jul. 5, 2022

(54) STORAGE MONITORING

(71) Applicant: HEWLETT-PACKARD DEVELOPMENT COMPANY, L.P., Spring, TX (US)

(72) Inventor: Ronaldo Rod Ferreira, Porto Alegre (BR)

(73) Assignee: Hewlett-Packard Development Company, L.P., Spring, TX (US)

(*) Notice: Subject to any disclaimer, the term of this patent is extended or adjusted under 35 U.S.C. 154(b) by 124 days.

(21) Appl. No.: 16/479,458

(22) PCT Filed: Aug. 16, 2017

(86) PCT No.: PCT/US2017/047180
§ 371 (c)(1),
(2) Date: Jul. 19, 2019

(87) PCT Pub. No.: WO2019/035825
PCT Pub. Date: Feb. 21, 2019

(65) Prior Publication Data
US 2021/0081543 A1   Mar. 18, 2021

(51) Int. Cl.
*G06F 21/60* (2013.01)
*G06F 9/4401* (2018.01)

(52) U.S. Cl.
CPC .......... *G06F 21/602* (2013.01); *G06F 9/4406* (2013.01)

(58) Field of Classification Search
CPC .............................. G06F 21/602; G06F 9/4406
(Continued)

(56) References Cited

U.S. PATENT DOCUMENTS 6,678,828 B1   1/2004 Pham et al.
2003/0097558 A1   5/2003 England et al.
(Continued)

FOREIGN PATENT DOCUMENTS

WO   WO-2017052944 A1   3/2017

OTHER PUBLICATIONS

Chow, "Controlling Data in the Cloud: Outsourcing Computation without Outsourcing Control", 2009, ACM, pp. 1-6, (Year: 2009).*

(Continued)

*Primary Examiner* — David J Pearson
*Assistant Examiner* — Gregory A Lane
(74) *Attorney, Agent, or Firm* — HP Inc. Patent Department (57) ABSTRACT

Examples associated with storage monitoring are described. One example system includes generating an encryption key and transmitting the encryption key to a basic input/output system (BIOS) security module. The BIOS security module uses the encryption key as a basis for a heartbeat. A provisioning module receives a signal identifying a monitored storage and generates an enforced storage associated with the monitored storage. The provisioning module also creates a manifest describing the relationship between the enforced storage and the monitored storage. The provisioning module transmits the manifest to the BIOS security module. A versioning module assigns a first access policy for the monitored storage and a second access policy to the enforced storage based on the manifest. The versioning module performs versioning for the monitored storage using the enforced storage, and periodically verifies operation to the BIOS security module using the heartbeat.

20 Claims, 6 Drawing Sheets

(58) Field of Classification Search
USPC .......................................................... 713/189
See application file for complete search history.

(56) References Cited

U.S. PATENT DOCUMENTS

| | | |
|---|---|---|
| 2005/0010835 A1 | 1/2005 | Childs et al. |
| 2006/0026422 A1* | 2/2006 | Bade .................... H04L 9/0877 713/164 |
| 2006/0143446 A1 | 6/2006 | Frank et al. |
| 2006/0259782 A1* | 11/2006 | Wang .................. G06F 21/6245 713/189 |
| 2007/0180268 A1 | 8/2007 | Filimon et al. |
| 2009/0172410 A1* | 7/2009 | Maor .................. G06F 21/6218 713/189 |
| 2011/0082838 A1 | 4/2011 | Jarno |
| 2015/0179033 A1* | 6/2015 | Birk .................... H04W 4/021 340/572.1 |
| 2016/0063256 A1 | 3/2016 | Bhansali et al. |
| 2017/0076096 A1 | 3/2017 | Challener |
| 2017/0091467 A1* | 3/2017 | Pogorelik ............... G06F 21/57 |
| 2017/0235758 A1* | 8/2017 | Gopalapura Venkatesh ................ G06F 16/183 707/625 |

OTHER PUBLICATIONS

TPH Key Backup and Recovery for Trusted Platforms, 2006, < https://www.infineon.com/dgdl/Infineon-TPM_Key_Backup_and_Recovery-APv01_00-EN.pdf?fileId=db3a304412b407950112b41656d7203a >.

* cited by examiner

STORAGE MONITORING

BACKGROUND

Today, data stored on computers and other storage devices has become increasingly valuable, to individuals in their personal lives, to corporations that use the data to conduct business, and even governments that use data to provide services. The data may include, for example, documents, pictures, videos, spreadsheets, and so forth, and may relate to work, personal interests, memorable events, finances, and so forth.

BRIEF DESCRIPTION OF THE DRAWINGS

The present application may be more fully appreciated in connection with the following detailed description taken in conjunction with the accompanying drawings.

DETAILED DESCRIPTION

Systems, methods, and equivalents associated with storage monitoring are described. Recently, a type of malware attack known as ransomware has become increasingly prevalent. Ransomware operate by encrypting files on a computer, and then demanding the user pay a fee to decrypt the files. An individual user can lose personal files, photographs, videos, and so forth, and companies and governments can lose data that they rely on to operate. While this disclosure may primarily refer to cases associated with individual users, these examples are intended to be non-limiting, as the principles, and technology, and examples described herein may also apply similarly to companies, governments, and so forth, and their employees, officials, customers, and data.

To prevent damage by ransomware, a service that is monitored by a basic input/output system (BIOS) security module may facilitate versioning changes to protected files to prevent unauthorized changes to files on a computer and/or on storage devices accessible to the computer. These storage devices may include attached storages such as external hard drives, as well as cloud storages. The service may protect the files by applying an access policy that disables entities other than the service from modifying data in enforced storages containing versioned backups of data in monitored storages. This may ensure existence of a backup copy of data in the event that data in monitored storages is modified by a ransomware or other malicious entity.

Figure 1:
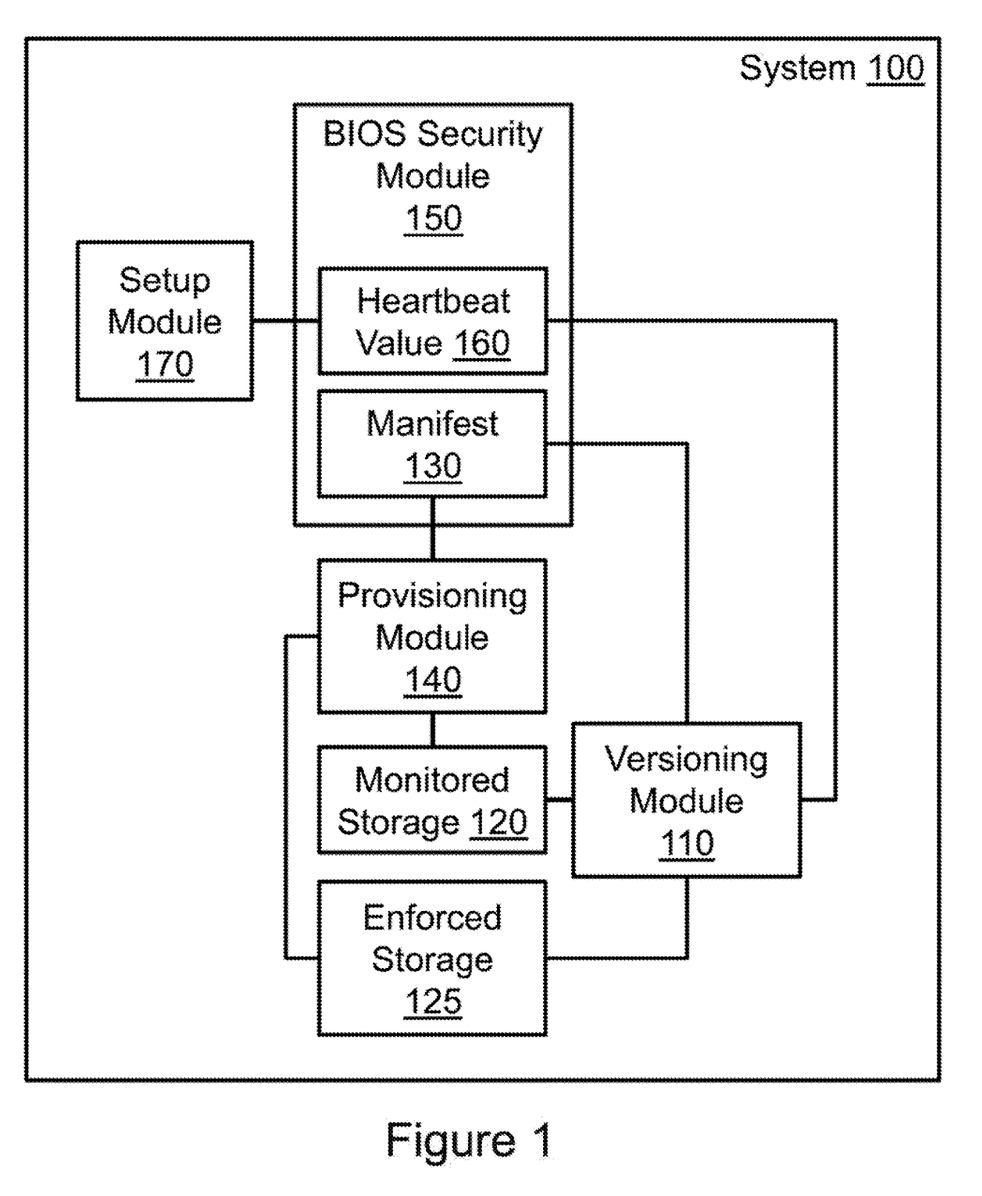
FIG. 1 illustrates an example system associated with storage monitoring.

FIG. 1 illustrates an example system associated with storage monitoring. It should be appreciated that the items depicted in FIG. 1 are illustrative examples, and many different systems, devices, and so forth, may operate in accordance with various examples.

FIG. 1 illustrates an example system 100 associated with storage monitoring. System 100 may refer to a device, components of a device, one or more processes operating on a device, and so forth. System 100 includes a versioning module 110. Versioning module 110 may perform various tasks to protect data stored in a monitored storage 120 from being manipulated or damaged by a malicious entity (e.g., a malware). The versioning module may achieve this by use of an enforced storage 125. Specifically, with the aid of other components of system 100, versioning module 110 may generate a chain of backup versions of files from monitored storage 120 to enforced storage 125 as those changes are made. This may ensure that even if a malicious entity is able to modify a file in monitored storage 120, and even if that modification is backed up to enforced storage 125, harm by the modification can be undone by reverting to a prior version of that file in enforced storage 125.

With that in mind, several setup actions may be taken to ensure that enforced storage 125 and versioning module 110 are not tampered with by the malicious entity. First, a setup module 170 may create an encryption key and transmit that key to a basic input/output system (BIOS) security module 150. Setup module 170 may create this encryption key, for example, as a part of installing versioning module 110 on system 100, as a part of setting up system 100, during manufacture of a device including system 100, and so forth. BIOS security module 150 may use the encryption key as the basis for a heartbeat value 160. While versioning module 110 is operating, versioning module 110 may periodically read heartbeat value 160 and transmit heartbeat value 160 back to BIOS security module 150. In various examples, heartbeat value 160 may be changed over time by BIOS security module and/or be encrypted using a variety of techniques, so that versioning module 110 has to take a specific action to prove the versioning module 110 has access to heartbeat value 160, and is operating correctly. These measures may, for example, prevent replay and other types of attacks that may attempt to hide the fact that versioning module 110 has been tampered with. By way of illustration, BIOS security module 150 may generate a value based on a timestamp and encrypt the value using the encryption key and store the encrypted value as heartbeat value 160. Versioning module 110 may then read heartbeat value 160, decrypt the original value using a decryption key, and then transmit the value back to BIOS security module 150 to prove that versioning module 110 is active and in proper operation.

When BIOS security module 150 fails to receive a heartbeat value from versioning module 110 for a predefined period of time, BIOS security module 150 may suspect that versioning module 110 has been tampered with by a malicious entity (e.g., modified, disabled). This may cause BIOS security module 150 to attempt to take action to protect system 100 and the data stored thereon. For example, BIOS security module 150 may restart versioning module 110, prevent further modifications to monitored storage 120 and/or enforced storage 125, terminate a process believed to have interfered with versioning module 110, alert a user of system 110, and so forth.

Having established security around the proper operation of versioning module 110, system 100 may also perform some setup actions to create enforced storage 125 and persist an association between enforced storage 125 and monitored storage 120. This process may be performed by a provisioning module 140. Provisioning module 140 may receive a signal identifying monitored storage 120. This signal may be provided by, for example, a user input that indicates the user seeks to ensure the files stored in monitored storage 120 are protected. Based on this signal, provisioning module may generate enforced storage 125 and a manifest 130. Manifest 130 may describe a relationship between monitored storage 120 and enforced storage 125. When there are multiple monitored storages 120, multiple enforced storages 125 may be created and associated with respective monitored storages 120 in manifest 130. Once provisioning module 140 has created enforced storage 125, and manifest 130, provisioning module 140 may store manifest 130 in BIOS security module 150 to later be retrieved by versioning module 110.

In various examples, provisioning module 140 may guide a user through the process of selecting monitored storage(s) 120 for protecting. This may ensure that enforced storages 125 are created primarily for storages containing data that is valuable to the user. Because versioning changes to a file may use substantial memory resources, the user may be encouraged to select monitored storage(s) 120 that contain files that might otherwise be irretrievable if damaged. By way of illustration, application files may be able to be re-downloaded, and system files may be able to be repaired, but an image file, a personal document, or a financial spreadsheet may exist only in monitored storage 120. Thus, while application files and/or system files associated with the operation of system 100 and the applications thereon could be protected using techniques described in association with versioning module 110, it may be a better use of resources of system 100 to focus on versioning personal files of the user(s) of system 100. In examples where a corporation or a government is operating system 100, provisioning module 140 may select monitored storage 120 based on a policy appropriate to that corporation or government. In these examples, provisioning module 140 and setup module 170 may operate as a part of a deployment of a device into which system 100 is embedded.

Once manifest 130 has been stored in BIOS security module 150, versioning module 110 may be ready to begin protecting data in monitored storage 120. Thus, when system 100 initiates, versioning module 110 may also be launched and perform several actions to establish access controls for monitored storage 120 and enforced storage 125. For example, versioning module 110 may load manifest 130 so that versioning module 110 knows which storage locations are monitored storages 120 and enforced storages 125. Versioning module 110 may then create access policies for monitored storage 120 and enforced storage 125. The access policy for monitored storage 120 may cause versioning module 110 to be notified whenever a change is made to the contents of monitored storage 120. This may allow versioning module 110 to back up that change to enforced storage 125. The change to the contents of monitored storage 120 may include, creating a file, modifying a file, renaming a file, deleting a file, and so forth. The access policy created for enforced storage 125 may disable entities other than versioning module 110 from modifying contents of enforced storage 125. While it may be possible to create the access policy so that some other trusted entities can also modify enforced storage 125, it may be desirable to reduce access to enforced storage 125 to constrain potential attack venues on enforced storage 125.

Once the access policies are in place for monitored storage 120 and enforced storage 125, versioning module 110 may then ensure that the contents of monitored storage 120 are backed up to enforced storage 125. This may involve copying the contents of monitored storage 120 to enforced storage 125 during a first initiation of versioning module 110 for a particular monitored storage 120. During subsequent initiations of versioning module 110, an initial backup may be unnecessary because backup versions of the contents of monitored storage 120 may already exist in enforced storage 125. However, if a change to the contents of monitored storage were made while versioning module 110 is offline (e.g., if monitored storage is a shared storage), versioning module 110 may take appropriate actions to backup these changes during subsequent initiations of versioning module 110. As changes to files in monitored storage 120 are detected during the operating of system 100, versioning module 110 may back up these changes to enforced storage 125. These changes may take the form of new, timestamped copies of the files, data describing the changes from an original backup, and so forth. When there are multiple monitored storages 120 and enforced storages 125, versioning module 110 may ensure that the contents of the monitored storages 120 are backed up to corresponding enforced storages 125 as identified in the manifest.

The backups maintained in enforced storage 125 may be maintained based on a storage policy. The storage policy may be designed to ensure that data is preserved, while reducing the amount of storage space used by the backup copies. Depending on how often files in enforced storage are modified, as well as the size of those files, it may be desirable to limit the number of backups maintained, while still ensuring certain guarantees regarding the chances a malware can affect the backups copies. Other concerns may also affect the storage policies. By way of illustration, examples herein relate to the prevention of malware, which may not require each backup of a file to be stored to have a high likelihood of being able to recover a usable version of the file. However, other applications for versioning data may benefit from additional intermediary copies, thereby affecting the storage policy accordingly.

In the event a malware (e.g., a ransomware is found to be changing (e.g., encrypting) files in monitored storage 120, system 100 may include a repair module (not shown) to facilitate reverting these changes. For example, if a ransomware is detected, a user may be able to trigger the repair module to revert files in monitored storage 120 to a prior, decrypted state, using backup versions of those files in enforced storage 125. This may be possible even when an encrypted version of a file created by the malware is stored in enforced storage 125 by versioning module 110 because prior backups of that file may remain in the unencrypted state.

While monitored storage 120 and enforced storage 125 are illustrated as internal to system 100 in this example, in other examples, these storages may be external to system 100 alone or in combination. This may allow a user that relies on a remote backup system, whether an attached device or a cloud storage, to point to that remote system as a monitored storage 120. Allowing the user to point to remote storages may be desirable because ransomware may target remote storages in addition to local files, and/or because the remote storage may be are designed to maintain a single backup of files for the purpose of recovering from a failure of system 100, and so forth.

It is appreciated that, in the following description, numerous specific details are set forth to provide a thorough understanding of the examples. However, it is appreciated that the examples may be practiced without limitation to these specific details. In other instances, methods and structures may not be described in detail to avoid unnecessarily obscuring the description of the examples. Also, the examples may be used in combination with each other.

"Module", as used herein, includes but is not limited to hardware, firmware, software stored on a computer-readable medium or in execution on a machine, and/or combinations of each to perform a function(s) or an action(s), and/or to cause a function or action from another module, method, and/or system. A module may include a software controlled microprocessor, a discrete module, an analog circuit, a digital circuit, a programmed module device, a memory device containing instructions, and so on. Modules may include gates, combinations of gates, or other circuit components. Where multiple logical modules are described, it may be possible to incorporate the multiple logical modules into one physical module. Similarly, where a single logical module is described, it may be possible to distribute that single logical module between multiple physical modules.

Figure 2:
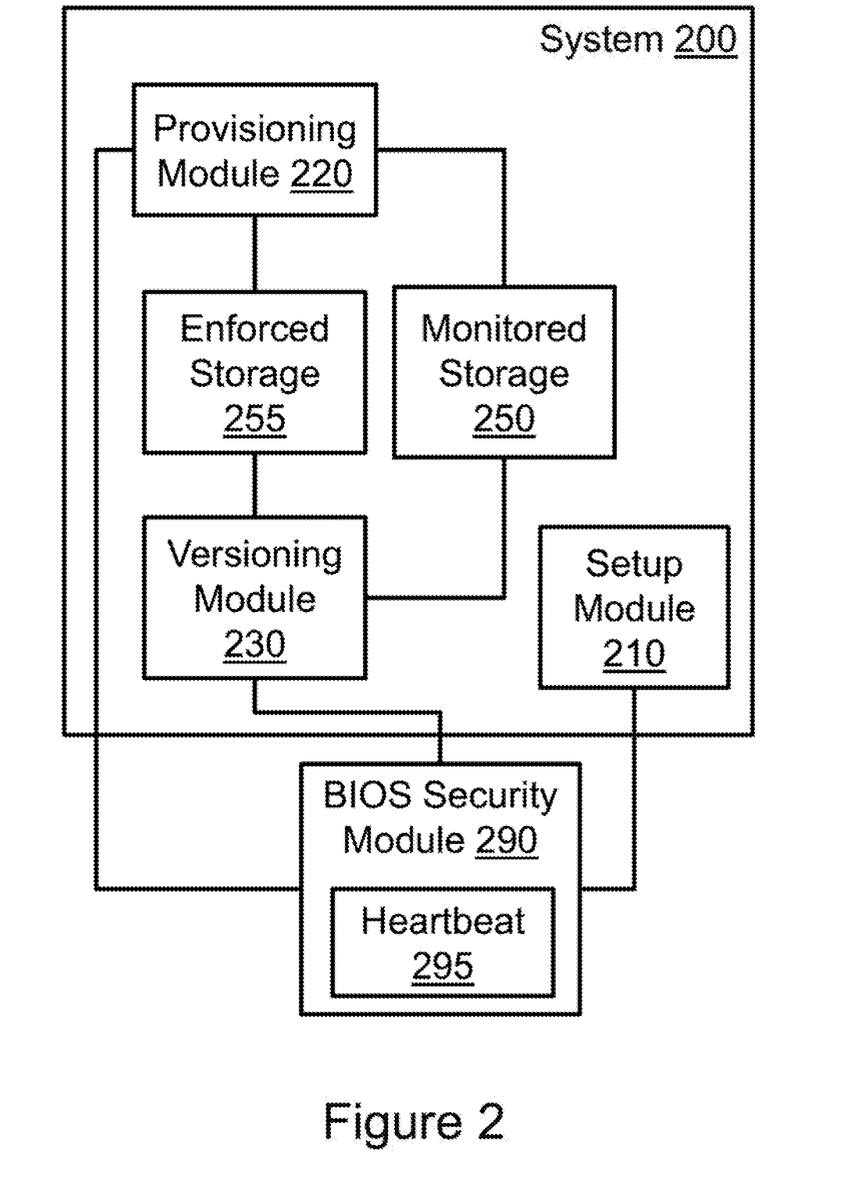
FIG. 2 illustrates another example system associated with storage monitoring.

FIG. 2 illustrates an example system 200 associated with storage monitoring. System 200 includes a setup module 210. Setup module 210 may generate an encryption key. Setup module 210 may also transmit the encryption key to a basic input/output system (BIOS) security module 290. BIOS security module 290 may use the encryption key as a basis for a heartbeat 295. A heartbeat may be a value or a basis for a value that may be exchanged between entities to prove the continued proper operation of the entities to one another. In this example, the heartbeat may be used in combination with a versioning module 230 (see below) to ensure continued operation of versioning module 230. In this example BIOS security module 290 is illustrated as being external to system 200. In other examples, BIOS security module 290 may reside within system 200, a component thereof, and so forth.

System 200 also includes a provisioning module 220. Provisioning module may receive a signal identifying a monitored storage 250. Based on the signal, provisioning module 220 may generate an enforced storage 255. Enforced storage 255 may be associated with monitored storage 250. Provisioning module 220 may also create a manifest that describes a relationship between enforced storage 255 and monitored storage 250. Provisioning module 220 may transmit the manifest to BIOS security module 290, which may store the manifest. In this example, enforced storage 255 and monitored storage 250 are illustrated as being internal to system 200. In other examples, enforced storage 255 and/or monitored storage 250 may be external to system 200.

System 200 also includes versioning module 230. Versioning module 230 may assign a first access policy to monitored storage 250 and a second access policy to enforced storage 255. The first access policy may alert versioning module 230 to changes to data in monitored storage 250 to facilitate versioning monitored storage 250. The second access policy may disable modification of data in enforced storage 255 except by versioning module 230. These access policies may be assigned based on the manifest after versioning module 230 retrieves the manifest from BIOS security module 290. Versioning module 230 may perform versioning for monitored storage 250 using enforced storage 255. Performing versioning for monitored storage 250 may include creating a backup version of files from monitored storage 250 to enforced storage 255. Further, upon detecting changes to files in monitored storage 250, versioning monitored storage 250 may include storing versioned copies of files in the enforced storage according to a backup policy. Versioning module 230 may also periodically verify that versioning module 230 is operating properly to BIOS security module 290 based on heartbeat 295. This may be achieved by, for example, versioning module 230 reading heartbeat 295 from BIOS security module 290, decrypting a value from heartbeat 295, and transmitting the decrypted value back to BIOS security module 290.

In some examples system 200 may include a malware detection module (not shown). The malware detection module may perform a remedial action upon detecting the occurrence of, for example, a change to the enforced storage by an entity other than versioning module 230, failure of versioning module 230 to verify operation to BIOS security module 290 for a predefined period of time, a user action, a combination thereof and so forth. The remedial action may be, for example, locking system 200, terminating a process (e.g., a suspected malware), alerting a user, restoring data in monitored storage 250 to a prior state using data from enforced storage 255, a combination thereof, and so forth.

Figure 3:
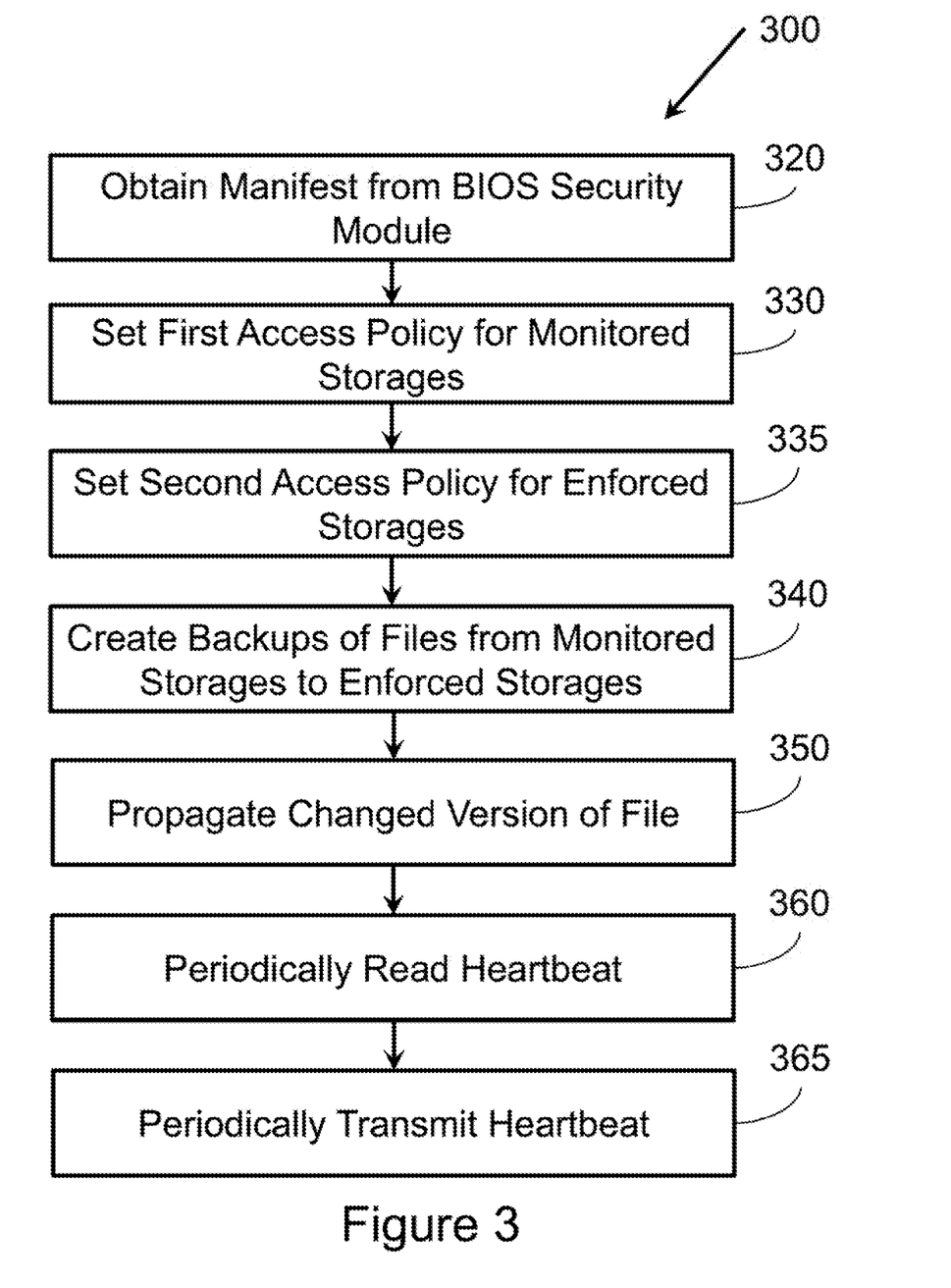
FIG. 3 illustrates a flowchart of example operations associated with storage monitoring.

FIG. 3 illustrates an example method 300. Method 300 may be embodied on a non-transitory processor-readable medium storing processor-executable instructions. The instructions, when executed by a processor, may cause the processor to perform method 300. In other examples, method 300 may exist within logic gates and/or RAM of an application specific integrated circuit (ASIC).

Method 300 may perform various tasks associated with storage monitoring. Method 300 includes obtaining a manifest at 320. The manifest may be obtained from a basic input/output system (BIOS) security module of a system. The manifest may describe relationships between members of a set of monitored storages and respective members of a set of enforced storage.

Method 300 also includes setting a first access policy for members of the set of monitored storages at 330. The first access policy may trigger an event notifying a process performing method 300 when data in members of the set of the monitored storages is modified. Method 300 also includes setting a second access policy for the members of the set of enforced storages at 335. The second access policy may disable entities other than a process performing method 300 from modifying contents of members of the set of enforced storages.

Method 300 also includes creating backup versions of files from the members of the set of monitored storages at 340. The backup versions of the files may be created in the respective members of the set of enforced storages based on the manifest.

Method 300 also includes propagating a changed version of a file at 350. The changed version may be propagated in response to detecting a change to a file in the monitored storage. The change may be detected based on an event triggered as a result of the access policy. The changed version may be propagated from the monitored storage to an enforced storage that corresponds to the monitored storage in the manifest. Propagating the changed version of the file may preserve a backup version of the file. Thus the enforced folder may contain versioned backups of files in the monitored folders.

Method 300 also includes periodically reading a heartbeat value from the BIOS security module at 360. Method 300 also includes periodically transmitting the heartbeat value to the BIOS security module at 365. This may prove to the BIOS security module that a process performing method 300 is operating properly and serve as evidence that a system in which the process is operating is secure.

Figure 4:
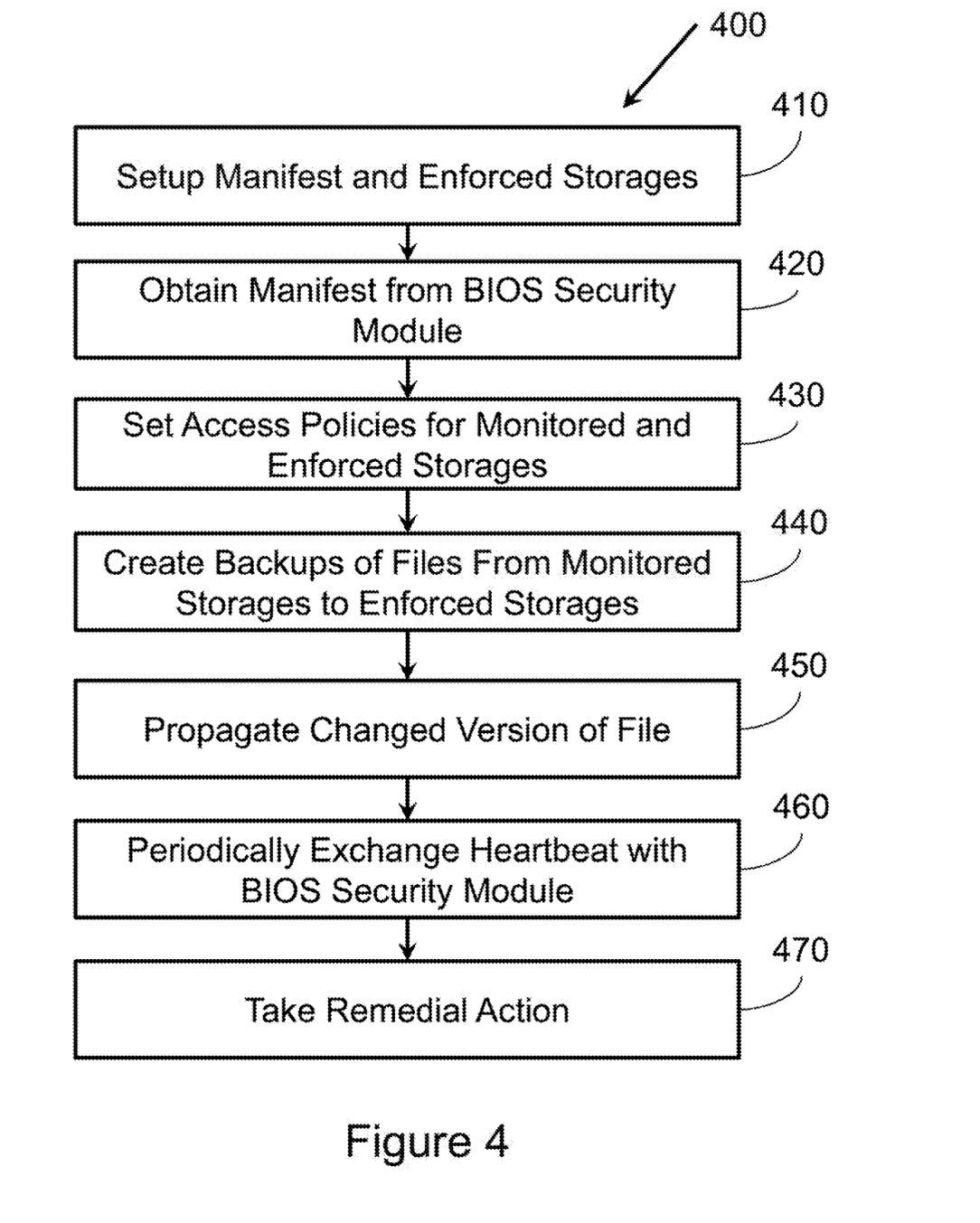
FIG. 4 illustrates another flowchart of example operations associated with storage monitoring.

Method 400 illustrates a method 400 associated with storage monitoring. Method 400 includes several actions similar to those described above with reference to method 300 (FIG. 3). For example, method 400 includes obtaining a manifest from a BIOS security module at 420, setting access policies for monitored and enforced storages at 430, creating backups of files from monitored storages to enforced storages at 440, propagating a changed version of a file at 450, and periodically exchanging a heartbeat with the BIOS security module at 460.

Method 400 also includes setting up the manifest and the enforced storages at 410. This may be completed upon receiving a signal identifying the members of the set of monitored storages. From this signal, the members of the set of enforced storages may be generated, along with the manifest that identifies the correspondence between the members of the set of enforced storages and the members of the set of monitored storages. Setting up the manifest may also include storing the manifest in the BIOS security module so that the manifest may be obtained at action 420.

Method 400 also includes taking a remedial action at 470. The remedial action may be taken upon, for example, detecting a change to a file in an enforced storage by a process without permission to modify the enforced storage according to the second access policy. The remedial action may be, for example, terminating the process, preventing further changes to the enforced storages, preventing changes to monitored storages, locking the system, informing a user, restoring the enforced storage to a prior state, or a combination thereof.

Figure 5:
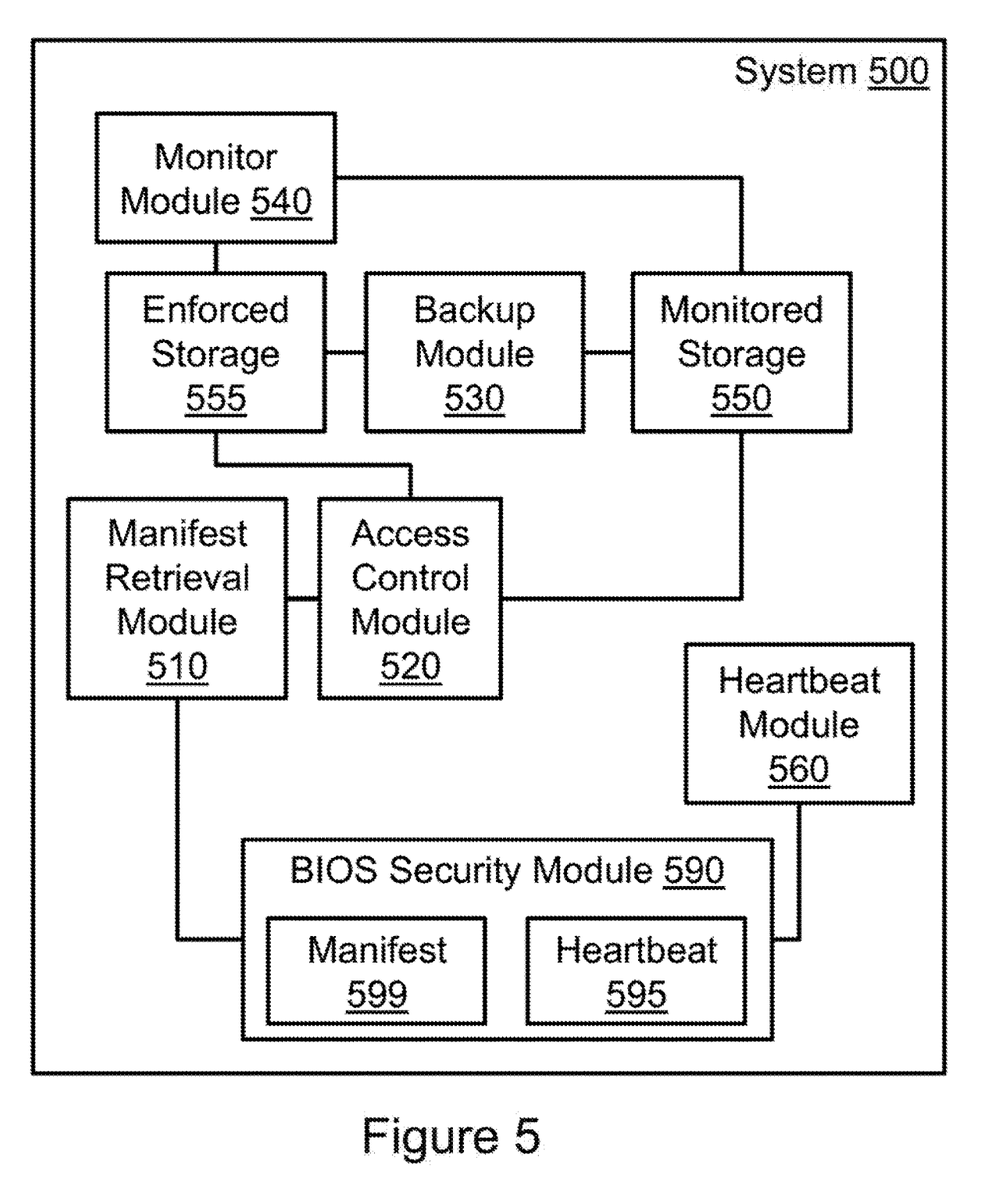
FIG. 5 illustrates another example system associated with storage monitoring.

FIG. 5 illustrates a system 500 associated with storage monitoring. System 500 includes a manifest retrieval module 510. Manifest retrieval module 510 may obtain a manifest 599 from a basic input/output system (BIOS) security module 590 of system 500. Manifest 599 may describe a relationship between a monitored storage 550 and an enforced storage 555.

System 500 also includes an access control module 520. Access control module 520 may use manifest 599 to assign a first access control policy to monitored storage 550 and a second access control policy to enforced storage 555. The first access control policy may trigger an event when a modification to the contents of monitored storage 550 occurs. The second access control policy may restrict modification access to enforced storage 555 except those associated with backing up contents of monitored storage 550 to enforced storage 55.

System 500 also includes a backup module 530. Backup module 530 may copy a file from monitored storage 550 to enforced storage 555. This may create a first backup version of the file from monitored storage 550.

System 500 also includes a monitor module 540. Monitor module 540 may detect changes to the file in monitored storage 550. Upon detecting a change, monitor module 540 may create a second backup version of the file to enforced storage 555. The second backup version may be created while maintaining the first backup version.

System 500 also includes a heartbeat module 540. Heartbeat module 560 may periodically read a heartbeat value 595 from BIOS security module 590 and transmit heartbeat value 595 to BIOS security module 590. If BIOS security module 590 does not receive heartbeat value 595 from heartbeat module 560 for a predetermined period of time, BIOS security module may take a remedial action to protect system 500. The remedial action may include, for example, terminating a process suspected of tampering with system 500, reinitiating a component of system 500, locking system 500, providing an alert to a user, a combination thereof, and so forth.

In some examples, system 500 may also include a setup module (not shown). The setup module may generate enforced storage 555 and manifest 599. Thus, the setup module may also store manifest 599 in BIOS security module 590.

In some examples, system 500 may also include a remedial action module (not shown). The remedial action module may restore the file from monitored storage 550 to a prior state upon detecting a ransomware attack on system 500. The state may be a state preserved by the first backup version of the file, the second backup version of the file, another backup version of the file, and so forth.

Figure 6:
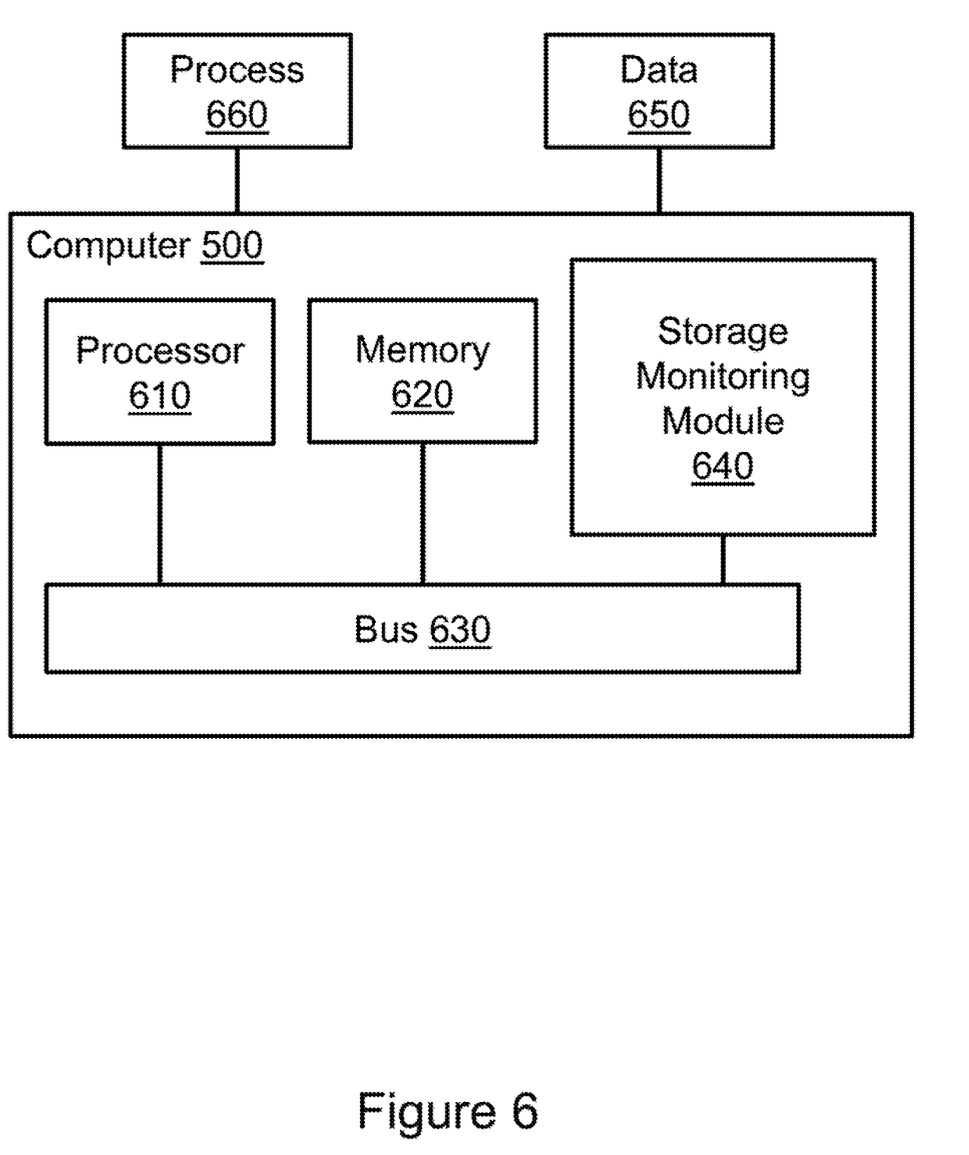
FIG. 6 illustrates an example computing device in which example systems, and methods, and equivalents, may operate.

FIG. 6 illustrates an example computing device in which example systems and methods, and equivalents, may operate. The example computing device may be a computer 600 that includes a processor 610 and a memory 620 connected by a bus 630. Computer 600 includes a storage monitoring module 640. Storage monitoring module 640 may perform, alone or in combination, various functions described above with reference to the example systems, methods, and so forth. In different examples, storage monitoring module 640 may be implemented as a non-transitory computer-readable medium storing processor-executable instructions, in hardware, software, firmware, an application specific integrated circuit, and/or combinations thereof.

The instructions may also be presented to computer 600 as data 650 and/or process 660 that are temporarily stored in memory 620 and then executed by processor 610. The processor 610 may be a variety of processors including dual microprocessor and other multi-processor architectures. Memory 620 may include non-volatile memory (e.g., read-only memory) and/or volatile memory (e.g., random access memory). Memory 620 may also be, for example, a magnetic disk drive, a solid state disk drive, a floppy disk drive, a tape drive, a flash memory card, an optical disk, and so on. Thus, memory 620 may store process 660 and/or data 650. Computer 600 may also be associated with other devices including other computers, devices, peripherals, and so forth in numerous configurations (not shown).

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A system comprising:
   a processor; and
   a non-transitory storage medium storing setup instructions, provisioning instructions, and versioning instructions,
   wherein the setup instructions are executable on the processor to generate an encryption key and transmit the encryption key to a basic input/output system (BIOS) security module;
   wherein the provisioning instructions are executable on the processor to receive information identifying a monitored storage, generate an enforced storage associated with the monitored storage, provide a manifest describing a relationship between the enforced storage and the monitored storage, and transmit the manifest to the BIOS security module; and
   wherein the versioning instructions are executable on the processor to:

assign, based on the manifest, a first access policy for the monitored storage and a different second access policy for the enforced storage;

perform versioning for the monitored storage using the enforced storage; and verify an operation of the versioning instructions to the BIOS security module using a heartbeat generated based on the encryption key.

2. The system of claim 1, wherein the non-transitory storage medium stores malware detection instructions to perform a remedial action in response to an occurrence of any or a combination of:

a change to the enforced storage by an entity other than the versioning instructions, or a failure of the versioning instructions to verify the operation to the BIOS security module.

3. The system of claim 2, where the remedial action includes any or a combination of:

locking the system, terminating a process, or restoring data from the monitored storage to a prior state using data from the enforced storage.

4. The system of claim 1, where the versioning instructions are executable on the processor to perform the versioning for the monitored storage by backing up, to the enforced storage, a change to data in the monitored storage such that a backup version of the changed data is stored in the enforced storage.

5. The system of claim 1, where the first access policy is to alert the versioning instructions to changes to data in the monitored storage to facilitate versioning the monitored storage, and where the second access policy is to disable modification of data in the enforced storage except by the versioning instructions.

6. A non-transitory computer-readable medium comprising versioning instructions that when executed cause a system to:

obtain a manifest from a basic input/output system (BIOS) security module of the system, wherein the manifest describes relationships between members of a set of monitored storages and respective members of a set of enforced storages;

set a first access policy for the members of the set of monitored storages;

set a different second access policy for the members of the set of enforced storages;

provide backup versions of files from the members of the set of monitored storages to the respective members of the set of enforced storages based on the manifest;

propagate, upon detecting a change to a file in a first monitored storage of the set of monitored storages, a backup version of the file to a first enforced storage that corresponds to the first monitored storage according to the manifest;

receive, at the versioning instructions from the BIOS security module, an encrypted heartbeat value as encrypted using an encryption key by the BIOS security module;

decrypt the encrypted heartbeat value to produce a decrypted heartbeat value; and transmit the decrypted heartbeat value from the versioning instructions to the BIOS security module.

7. The non-transitory computer-readable medium of claim 6, where the decrypting of the encrypted heartbeat value uses a decryption key.

8. The non-transitory computer-readable medium of claim 6, further comprising instructions that when executed cause the system to:

receive a signal identifying the members of the set of monitored storages;

generate the members of the set of enforced storages;

generate the manifest; and store the manifest in the BIOS security module.

9. The non-transitory computer-readable medium of claim 6, further comprising instructions that when executed cause the system to take a remedial action in response to detecting a change to a file in an enforced storage by a process without permission to modify the enforced storage according to the second access policy.

10. The non-transitory computer-readable medium of claim 9, where the remedial action includes any or a combination of:

terminating the process, preventing further changes to the set of enforced storages, preventing changes to the set of monitored storages, locking the system, or restoring the enforced storage to a prior state.

11. A system comprising:

a processor; and a non-transitory storage medium storing manifest retrieval instructions, access control instructions, backup instructions, monitor instructions, and heartbeat instructions, wherein the manifest retrieval instructions are executable on the processor to obtain a manifest from a basic input/output system (BIOS) security module of the system, where the manifest describes a relationship between a monitored storage and an enforced storage, wherein the access control instructions are executable on the processor to assign, based on the manifest, a first access control policy to the monitored storage and a different second access control policy to the enforced storage, wherein the backup instructions are executable on the processor to copy a file from the monitored storage to the enforced storage to create a first backup version of the file from the monitored storage, wherein the monitor instructions are executable on the processor to, in response to detecting a change to the file in the monitored storage, create a second backup version of the file to the enforced storage while maintaining the first backup version, and wherein the heartbeat instructions are executable on the processor to receive an encrypted heartbeat value as encrypted using an encryption key from the BIOS security module, decrypt the encrypted heartbeat value to produce a decrypted heartbeat value, and transmit the decrypted heartbeat value to the BIOS security module.

12. The system of claim 11, wherein the non-transitory storage medium stores setup instructions executable on the processor to generate the enforced storage and the manifest, and store the manifest in the BIOS security module.

13. The system of claim 11, wherein the non-transitory storage medium stores remedial action instructions executable on the processor to restore the file in the monitored storage to a state preserved by one of the first backup version and the second backup version in response to detecting a ransomware attack on the system.

14. The system of claim 1, wherein the versioning instructions are executable on the processor to:

receive, from the BIOS security module, the heartbeat generated based on the encryption key, the heartbeat comprising an encrypted value produced using the encryption key;

decrypt the encrypted value of the heartbeat to produce a decrypted value; and transmit, from the versioning instructions to the BIOS security module, the decrypted value to prove that the versioning instructions are in proper operation.

15. The system of claim 1, wherein the second access policy for the enforced storage disables entities other than the versioning instructions from modifying content of the enforced storage.

16. The system of claim 1, wherein the manifest transmitted by the provisioning instructions to the BIOS security module are stored by the BIOS security module, and wherein the versioning instructions are executable on the processor to obtain the manifest stored by the BIOS security module.

17. The system of claim 1, wherein the versioning instructions are alerted of a change in data in the monitored storage according to the first access policy.

18. The non-transitory computer-readable medium of claim 6, wherein the versioning instructions when executed cause the system to transmit the decrypted heartbeat value from the versioning instructions to the BIOS security module to verify an operation of the versioning instructions.

19. The system of claim 11, wherein the second access policy for the enforced storage disables entities other than the backup instructions from modifying content of the enforced storage.

20. The system of claim 11, wherein the heartbeat instructions are executable on the processor to transmit the decrypted heartbeat value from the versioning instructions to the BIOS security module to verify an operation of the backup instructions.

\* \* \* \* \*